United States Patent
Elkholy et al.

(10) Patent No.: US 10,141,971 B1
(45) Date of Patent: Nov. 27, 2018

(54) TRANSCEIVER CIRCUIT HAVING A SINGLE IMPEDANCE MATCHING NETWORK

(71) Applicant: Silicon Laboratories Inc., Austin, TX (US)

(72) Inventors: Mohamed Elkholy, College Station, TX (US); Ayman Shafik, Austin, TX (US); Yang Gao, Cedar Park, TX (US); Arup Mukherji, Austin, TX (US); Navin Harwalkar, Austin, TX (US)

(73) Assignee: Silicon Laboratories Inc., Austin, TX (US)

( * ) Notice: Subject to any disclaimer, the term of this patent is extended or adjusted under 35 U.S.C. 154(b) by 0 days.

(21) Appl. No.: 15/815,920

(22) Filed: Nov. 17, 2017

(51) Int. Cl.
 *H04B 1/40* (2015.01)
 *H04B 7/26* (2006.01)
 *H04B 1/04* (2006.01)
 *H04B 1/48* (2006.01)

(52) U.S. Cl.
 CPC ............. *H04B 1/40* (2013.01); *H04B 7/2615* (2013.01); *H04B 1/0458* (2013.01); *H04B 1/48* (2013.01)

(58) Field of Classification Search
 CPC ........... H03H 7/38; H04B 1/0458; H04B 1/48
 See application file for complete search history.

(56) References Cited

U.S. PATENT DOCUMENTS

| | | | |
|---|---|---|---|
| 5,375,256 A | 12/1994 | Yokoyama et al. | |
| 6,735,418 B1 * | 5/2004 | MacNally | H04B 1/0458 455/78 |
| 7,009,455 B2 | 3/2006 | Toncich et al. | |
| 7,671,693 B2 | 3/2010 | Brobston et al. | |
| 8,975,981 B2 | 3/2015 | See et al. | |
| 9,431,990 B2 | 8/2016 | Du Toit et al. | |
| 9,608,591 B2 | 3/2017 | Manssen et al. | |

(Continued)

OTHER PUBLICATIONS

A 1.9nJ/b 2.4GHz Multistandard (Bluetooth Low Energy/Zigbee/ IEEE802.15.6) Transceiver for Personal/Body-Area Networks, IEEE International Solid-State Circuits Conference, 3 pgs. (2013).

(Continued)

*Primary Examiner* — Ross Varndell
(74) *Attorney, Agent, or Firm* — Egan Peterman Enders Huston

(57) ABSTRACT

Embodiments of transceiver circuits disclosed herein include a first amplifier coupled to receive signals from an antenna during a receive (RX) mode of the transceiver circuit, a second amplifier coupled to transmit signals to the antenna during a transmit (TX) mode of the transceiver circuit, and a single impedance matching network coupled to the antenna and directly connected to a shared node to which the first and second amplifiers are directly connected. The single impedance matching network is configured to transform an impedance of the antenna into a resistance at the shared node. A control circuit is coupled to control the impedance transformation of the single impedance matching network, so as to provide a first resistance at the shared node during RX mode and a second resistance at the shared node during TX mode, wherein the second resistance is different from the first resistance.

22 Claims, 5 Drawing Sheets

(56) References Cited

U.S. PATENT DOCUMENTS

| | | | | |
|---|---|---|---|---|
| 2008/0094149 A1* | 4/2008 | Brobston | ............... | H03H 7/40 333/17.3 |
| 2010/0308933 A1* | 12/2010 | See | ................. | H03F 1/565 333/32 |
| 2013/0063223 A1* | 3/2013 | See | ................. | H03F 1/56 333/32 |
| 2016/0020818 A1 | 1/2016 | Chee et al. | | |

OTHER PUBLICATIONS

A 3.7mW-RX 4.4mW-TX Fully Integrated Bluetooth Low Energy/ IEEE802.15.4) Proprietary SoC With an ADPLL-Based Fast Frequency Offset Compensation in 40nm CMOS, IEEE International Solid-State Circuits Conference, 3 pgs. (2015).

A 10mW Bluetooth Low-Energy Transceiver With On-Chip Matching, IEEE International Solid-State Circuits Conference, 3 pgs. (2015).

A 6.3mW BLE Transceiver Embedded RX Image-Rejection Filter and TX Harmonic-Suppression Filter Reusing on Chip Matching Network, IEEE International Solid-State Circuits Conference, 3 pgs. (2015).

Kuo et al., "A Fully Integrated 28nm Bluetooth Low-Energy Transmitter With 36% System Efficiency at 3dBm", IEEE, 4 pgs. (2015).

\* cited by examiner

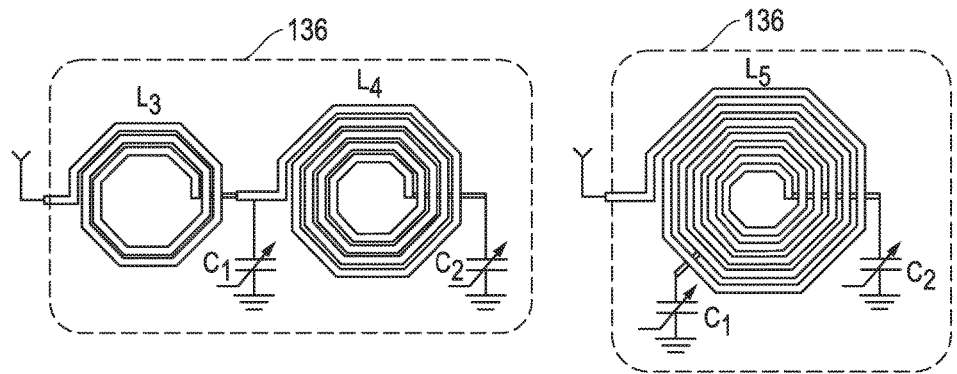
*FIG. 7A*     *FIG. 7B*
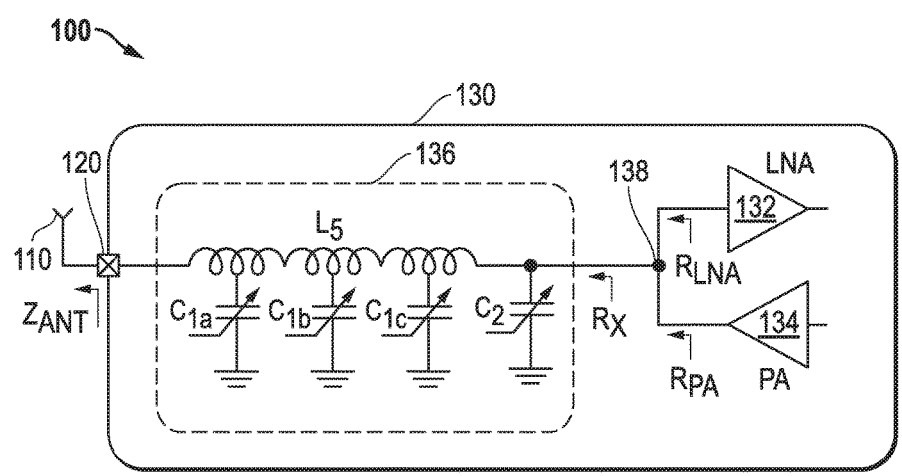
*FIG. 8*

TRANSCEIVER CIRCUIT HAVING A SINGLE IMPEDANCE MATCHING NETWORK

BACKGROUND

1. Field of the Disclosure

This disclosure relates to transceiver circuits and, more particularly, to impedance matching networks for transceiver circuits.

2. Description of the Relevant Art

The following descriptions and examples are provided as background only and are intended to reveal information that is believed to be of possible relevance to the present disclosure. No admission is necessarily intended, or should be construed, that any of the following information constitutes prior art impacting the patentable character of the subject matter claimed herein.

A wireless device may generally include a wireless transceiver for transmitting and receiving data in a wireless communication system. For data transmission, the wireless transceiver may modulate a radio frequency (RF) carrier signal with data to obtain a modulated signal, amplify the modulated signal to obtain an output RF signal having a desired output power level, and transmit the output RF signal via an antenna to another wireless device or base station. The wireless transceiver may include various circuits for transmitting data including amplifiers, local oscillators, mixers, filters, etc. For data reception, the wireless transceiver may receive an RF signal via the antenna, amplify the received RF signal and demodulate the amplified signal to decode or recover the data contained therein. The wireless transceiver may further include various circuits for receiving data, such as amplifiers, filters, demodulators, etc. Although not limited to such, some wireless transceivers include a power amplifier (PA) in the transmit path and a low noise amplifier (LNA) in the receive path of the transceiver for amplifying the transmit and receive signals, respectively.

Impedance matching networks are generally coupled between the antenna of a wireless device and the PA and LNA of the wireless transceiver to match the impedance of the antenna to the output impedance of the PA and the input impedance of the LNA. Impedance matching increases the power efficiency of the wireless transceiver by enabling the maximum amount of power to be transferred between a source and a load (e.g., the antenna and the LNA in receive mode, or the PA and the antenna in transmit mode) for a given signal. Examples of impedance matching networks used in conventional wireless transceivers are shown in FIGS. 1-2 (Prior Art) and discussed below.

FIG. 1 (Prior Art) is a block diagram illustrating a portion of a conventional wireless device 10 including an antenna 12 coupled to transceiver circuit 20 within an integrated circuit (IC). As shown in FIG. 1, wireless device 10 includes an off-chip transmit/receive switch 14 for selectively connecting LNA 22 or PA 24 of transceiver circuit 20 to antenna 12, and a pair of off-chip impedance matching networks 16, 18. In wireless device 10, impedance matching network ($MN_1$) 16 is coupled between a first switch ($S_1$) of transmit/receive switch 14 and a first input/output pad 26 of transceiver circuit 20 for matching the input impedance of LNA 22 to the impedance of antenna 12 during receive modes of the transceiver. Impedance matching network ($MN_2$) 18 is coupled between a second switch ($S_2$) of transmit/receive switch 14 and a second input/output pad 28 of transceiver circuit 20 for transforming the impedance of antenna 12 to a desired resistance at the output of PA 24 during transmit modes of the transceiver.

Impedance matching networks 16, 18 may be implemented in a variety of different ways. For an energy-efficient transceiver, $MN_1$ is often implemented as a step-up matching network working as a passive voltage amplifier, which is coupled in front of the LNA to minimize the required transconductance (gm) of the LNA. This enables $MN_1$ to achieve a relatively low noise figure (NF) and reduce the power consumption of the receiver. In the wireless device 10 shown in FIG. 1, $MN_1$ is implemented as a series inductor ($L_1$) having a fixed inductance, which is configured to resonate with the input capacitance of the LNA.

The configuration of impedance matching network 18 depends on the maximum output power of the PA. In the wireless device 10 shown in FIG. 1, $MN_2$ is implemented as a pi-network LC filter (e.g., C-$L_2$-C) having fixed values of inductance and capacitance selected to transform the impedance of antenna 12 into a resistance ($R_{PA}$) at the output of PA 24, which enables the PA to operate at maximum output power.

Although wireless device 10 provides relatively good performance, it uses an off-chip transmit/receive switch 14 to isolate the transmit and receive paths of transceiver circuit 20, and a pair of off-chip impedance matching networks ($MN_1$, $MN_2$) 16, 18 to provide separate impedance matching for the receive and transmit paths of transceiver circuit 20. The use of off-chip components enables high quality factor (Q) inductors to be used within impedance matching networks 16, 18 to minimize the insertion loss in the receive and transmit paths. Unfortunately, the off-chip components used for transmit/receive switch 14 and impedance matching networks ($MN_1$, $MN_2$) 16, 18 increases the cost and size of the radio frequency front end coupled between antenna 12 and transceiver circuit 20.

FIG. 2 (Prior Art) is a block diagram illustrating a portion of another wireless device 30 in which antenna 32 is directly connected to an I/O pin 34 of a transceiver circuit 40. In FIG. 2, the transmit/receive switch is removed and a pair of on-chip impedance matching networks 36, 38 is used to match the input impedance of LNA 42 to the antenna impedance during receive modes, and to transform the antenna impedance to a desired resistance at the output of PA 44 during transmit modes of the transceiver. In wireless device 30, impedance matching network ($MN_1$) 36 includes a switch ($S_3$) coupled in parallel with a series inductor ($L_1$), which has a fixed inductance that resonates with the input capacitance of the LNA. Similar to impedance matching network 18 of FIG. 1, impedance matching network 38 ($MN_2$) is implemented as a pi-network LC filter (e.g., $C_1$-$L_2$-$C_2$) to transform the impedance of antenna 32 into a resistance ($R_{PA}$) at the output of PA 44 that enables the PA to operate at maximum output power. In wireless device 30, however, $MN_2$ uses an inductor ($L_2$) with a fixed inductance and a pair of digitally-controlled capacitors ($C_1$ and $C_2$), whose capacitance may be adjusted to tune $MN_2$ matching network to the desired frequency band. Since on-chip capacitors are generally less accurate than off-chip capacitors, they require tuning to maintain operation within the desired frequency band. In addition, on-chip capacitors $C_1$ and $C_2$ may be further tuned during receive mode to a minimum capacitance to minimize the effect of $MN_2$ on the received signal.

In transmit mode, switch ($S_3$) is closed and impedance matching network 38 ($MN_2$) provides a low pass filter to transform the impedance of antenna 32 into a desired resistance ($R_{PA}$) at the output of PA 44. However, even in the off state, the parasitic capacitance ($C_{LNA}$) of LNA 42 resonates with the inductance of $L_1$, which causes a null near the frequency band of operation. Although impedance matching network 36 ($MN_1$) includes switch ($S_3$) to avoid this null by shunting $C_{LNA}$ to $C_1$ as part of impedance matching network 38 ($MN_2$), switch ($S_3$) inherently introduces a series resistance that reduces the efficiency of PA 44 during transmit mode.

In receive mode, switch ($S_3$) is opened and impedance matching network 36 ($MN_1$) is used to match the input impedance of LNA 42 to the impedance of antenna 32. However, due to coupling between $MN_1$ and $MN_2$, impedance matching network 38 ($MN_2$) operates as a notch filter, thereby generating a null in the transfer function of the LNA, during receive mode. Even if the capacitance of the digitally-controlled capacitors ($C_1$ and $C_2$) within $MN_2$ were set to a minimum value to push this null to a frequency higher than the frequency band of operation, the null increases the insertion loss of $MN_1$, which degrades the noise figure (NF) of LNA 42 during receive mode.

Wireless device 30 improves upon wireless device 10 by removing the transmit/receive switch 14 and using on-chip, instead of off-chip, impedance matching networks. However, the use of separate impedance matching networks 36, 38 in the transmit and receive paths of transceiver circuit 40 consumes a large amount of area and degrades performance of the LNA and PA due to coupling between impedance matching networks 36, 38. A need remains for an improved impedance matching network for wireless transceiver circuits.

SUMMARY

The following description of various embodiments of transceiver circuits and methods is not to be construed in any way as limiting the subject matter of the appended claims.

Generally speaking, the present disclosure provides various embodiments of a transceiver circuit having a single impedance matching network, which is shared by two or more amplifiers included within transmit and receive paths of the transceiver circuit. For one embodiment, the transceiver circuit including the single impedance matching network and the transmit/receive paths are located on an integrated circuit (IC) chip. As described herein, the single impedance matching network may be programmably configured to provide a different impedance transformation during transmit and receive modes of the transceiver circuit. In addition to cost and area savings, the shared, on-chip impedance matching network described herein improves the performance of the amplifiers included within the transmit and receive paths of the transceiver circuit by avoiding the use of a transmit/receive switch, and by programmably reconfiguring the shared, on-chip impedance matching network to provide a desired impedance transformation during transmit and receive modes.

According to one embodiment, a transceiver circuit is provided herein including a first amplifier, a second amplifier, a single impedance matching network, and a control circuit. The first amplifier is coupled to receive signals from an antenna during a receive (RX) mode of the transceiver circuit, and the second amplifier is coupled to transmit signals to the antenna during a transmit (TX) mode of the transceiver circuit. The first and second amplifiers are directly connected to a shared node. The single impedance matching network is coupled to the antenna, directly connected to the shared node, and configured to transform an impedance of the antenna into a resistance at the shared node. The control circuit is coupled to control the impedance transformation of the single impedance matching network, so as to provide a first resistance at the shared node during the RX mode and a second resistance at the shared node during the TX mode. In one embodiment, the transceiver circuit is time division duplex (TDD) transceiver, and the TX and RX modes occur at different times.

In one embodiment, the first amplifier, the second amplifier and the single impedance matching network are provided on an integrated circuit (IC) chip, and the antenna is an off-chip component, which is not provided on the IC chip. In such an embodiment, the single impedance matching network may be coupled to the antenna via a single input/output (I/O) pad of the IC chip. In particular, the single impedance matching network may be directly connected to the single I/O pad of the IC chip. In one embodiment, the control circuit may also be provided on the IC chip. In other embodiments, the control circuit may be off-chip.

The control circuit may be configured to control the impedance transformation of the single impedance matching network, so that the first resistance provided at the shared node during the RX mode is different from the second resistance provided at the shared node during the TX mode. In one embodiment, the first resistance is a resistance desired at an input of the first amplifier to achieve a maximum voltage gain at the input of the first amplifier. In one embodiment, the second resistance is a resistance desired at an output of the second amplifier to achieve a maximum output power at the output of the second amplifier.

The single impedance matching network includes a plurality of reactive elements, comprising at least one variable reactive element having a reactance that is reconfigurable to provide the first resistance at the shared node during the RX mode and the second resistance at the shared node during the TX mode. In general, the single impedance matching network may include a multiple stage inductor-capacitor (LC) network including at least a first stage and a second stage cascaded with the first stage. In a first embodiment, the first stage and the second stage may each include a series inductor and a variable capacitor, which is coupled to the series inductor in an L-network configuration. In a second embodiment, the first stage may include a series inductor and a first variable capacitor, which is coupled to a center tap point of the series inductor, and the second stage may include a second variable capacitor coupled to the series inductor in an L-network configuration. In a third embodiment, the first stage may include a series inductor and a plurality of variable capacitors, each coupled to a different tap point of the series inductor, and the second stage may include an additional variable capacitor coupled to the series inductor in an L-network configuration. In a fourth embodiment, the first stage and the second stage may each include a series capacitor, a shunt inductor, and a variable capacitor, which is coupled in parallel with the shunt inductor. In each embodiment disclosed herein, the first stage and the second stage each include at least one variable capacitor having a capacitance that is reconfigurable.

In general, the control circuit is coupled to the single impedance matching network and configured to control the capacitance of the variable capacitors included within the first and second stages to provide the first resistance at the shared node during RX mode and the second resistance at the shared node during TX mode. In one embodiment, the control circuit may use two or more sets of predetermined values to control the capacitance of the variable capacitors included within the first and second stages. In one embodiment, the control circuit may include a memory element for storing the two or more sets of predetermined values.

In one embodiment, the two or more sets of predetermined values may include a first set of predetermined values and a second set of predetermined values, which differ from the first set of predetermined values. The first set of predetermined values may be used during RX mode to control the capacitance of the variable capacitors included within the first and second stages to transform the impedance of the antenna into the first resistance at the shared node. The second set of predetermined values may be used during TX mode to control the capacitance of the variable capacitors included within the first and second stages to transform the impedance of the antenna into the second resistance. In some embodiments, the two or more sets of predetermined values may further include a third set of predetermined values, which may be used during TX mode to control the capacitance of the variable capacitors included within the first and second stages to transform the impedance of the antenna into a third resistance, which is greater than the second resistance.

According to another embodiment, a method is provided herein for configuring a single impedance matching network shared by a first amplifier in a receive path and a second amplifier in a transmit path of a transceiver circuit. Although not limited to such, the single impedance matching network may include a two-stage inductor-capacitor (LC) network, where a first stage of the LC network and a second stage of the LC network each include at least one variable capacitor. In general, the method may include determining a first set of capacitance values and a second set of capacitance values for configuring the variable capacitors included within the first and second stages of the LC network. The second set of capacitance values may differ from the first set of capacitance values. Once the first set of capacitance values are determined, they may be subsequently used during a receive mode of the transceiver circuit to transform an antenna impedance into a first resistance at an input of the first amplifier. The first resistance may be based on a voltage gain desired at an input of the first amplifier. Once the second set of capacitance values are determined, they may be subsequently used during a transmit mode of the transceiver circuit to transform the antenna impedance into a second resistance at an output of the second amplifier. The second resistance may be based on an output power desired at an output of the second amplifier.

In one embodiment, the step of determining a first set of capacitance values may involve setting a first variable capacitor in the first stage of the LC network to a minimum capacitance value and determining a maximum capacitance value of a second variable capacitor in the second stage of the LC network. The maximum capacitance value may be proportional to a quality factor of the LC network and inversely proportional to a maximum resistance of the LC network.

In one embodiment, the step of determining a second set of capacitance values may involve determining a first capacitance value of a first variable capacitor in the first stage of the LC network for transforming the impedance of the antenna into an intermediate resistance, where the first capacitance value is proportional to a quality factor of the first stage of the LC network and inversely proportional to the intermediate resistance. The step of determining a second set of capacitance values may further involve determining a second capacitance value of a second variable capacitor in the second stage of the LC network for transforming the intermediate resistance into the second resistance, where the second capacitance value is proportional to a quality factor of the second stage of the LC network and inversely proportional to the second resistance.

BRIEF DESCRIPTION OF THE DRAWINGS

Other objects and advantages of the disclosure will become apparent upon reading the following detailed description and upon reference to the accompanying drawings.

FIGS. 7A-B are schematic circuit diagrams illustrating a comparison of the area consumed by the impedance matching networks shown in the embodiments of FIGS. 3 and 5;

FIG. 8 is a block diagram of a wireless device including a transceiver circuit, which is provided on an IC chip having a shared, on-chip impedance matching network, in accordance with a third another embodiment of the present disclosure;

Figure 1:
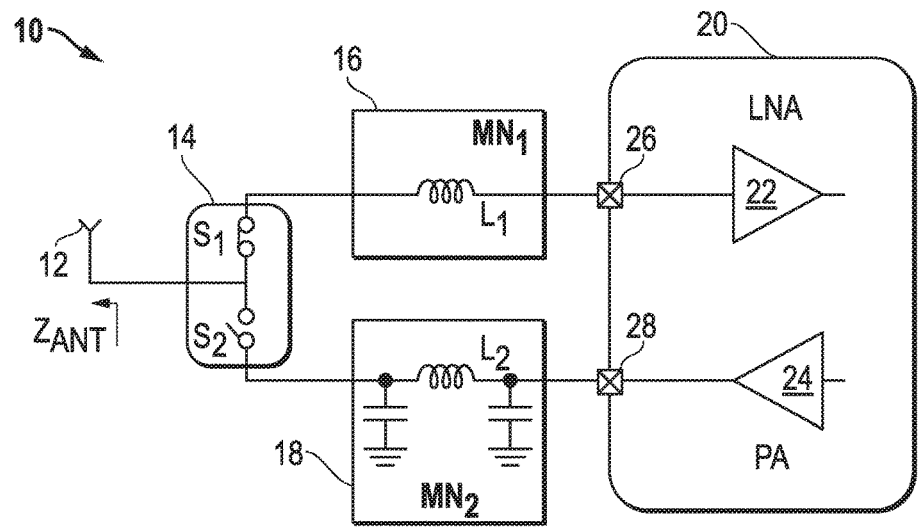
FIG. 1 (Prior Art) is a block diagram of a prior art wireless device including a transceiver circuit, which is provided on an integrated circuit (IC) chip and coupled to a pair of off-chip impedance matching networks.

While the embodiments disclosed herein are susceptible to various modifications and alternative forms, specific embodiments thereof are shown by way of example in the drawings and will herein be described in detail. It should be understood, however, that the drawings and detailed description thereto are not intended to limit the disclosure to the particular form disclosed, but on the contrary, the disclosure is intended to cover all modifications, equivalents and alternatives falling within the spirit and scope of the present disclosure as defined by the appended claims.

DETAILED DESCRIPTION OF PREFERRED EMBODIMENTS

Generally speaking, the present disclosure provides various embodiments of a transceiver circuit having a single impedance matching network, which is shared by two or more amplifiers included within transmit and receive paths of the transceiver circuit. For one embodiment, the transceiver circuit including the single impedance matching network and the transmit/receive paths are located on an integrated circuit (IC) chip. As described herein, the single impedance matching network may be programmably configured to provide a different impedance transformation during transmit and receive modes of the transceiver circuit. In addition to cost and area savings, the shared, on-chip impedance matching network described herein improves the performance of the amplifiers included within the transmit and receive paths of the transceiver circuit by avoiding the use of a transmit/receive switch, and by programmably reconfiguring the shared, on-chip impedance matching network to provide a desired impedance transformation during transmit and receive modes.

Figure 3:
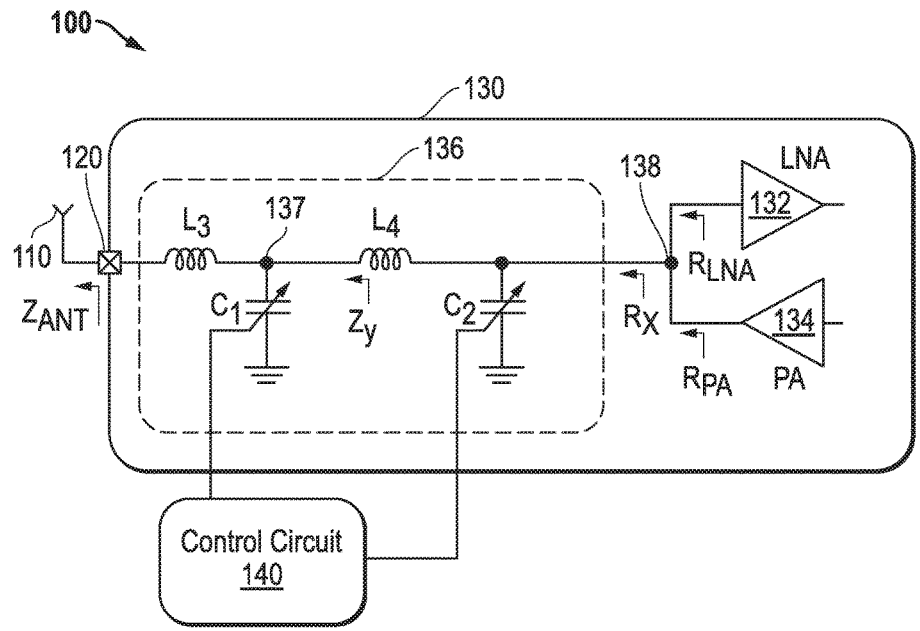
FIG. 3 is a block diagram of a wireless device including a transceiver circuit, which is provided on an IC chip having a shared, on-chip impedance matching network, in accordance with a first embodiment of the present disclosure.

FIG. 3 illustrates a wireless device 100 and transceiver circuit 130, in accordance with a first embodiment of the present disclosure. In the embodiment of FIG. 3, antenna 110 is directly connected to input/output (I/O) pin 120 of transceiver circuit 130. As described in more detail below, transceiver circuit 130 includes various circuits configured to receive and transmit radio frequency (RF) signals via antenna 110. In one embodiment, all circuitry used to implement transceiver circuit 130 may be provided on a common semiconductor substrate or a monolithic integrated circuit (IC) chip. In another embodiment, one or more components of transceiver circuit 130 may be provided on a separate substrate, which is coupled or bonded to the IC chip. As one example, one or more inductors (e.g., $L_3$ and $L_4$ of FIG. 3; $L_5$ of FIGS. 5, 8) of the impedance matching network 136 described herein may be implemented on a separate high resistivity substrate (or alternatively, on an insulator, such as silicon dioxide or glass) to maximize the quality factor of the inductors, thereby achieving lower noise figure (NF) in receive mode and higher power efficiency in transmit mode.

In the embodiment shown in FIG. 3, transceiver circuit 130 includes at least a first amplifier 132, a second amplifier 134 and a single, on-chip impedance matching network 136. The first amplifier 132 is coupled within a receive path and the second amplifier 134 is coupled within a transmit path of transceiver circuit chip 130. The first amplifier 132 is configured to amplify the RF signals received by antenna 110 from another wireless device or base station during a receive (RX) mode of the transceiver circuit. The second amplifier 134 is configured to amplify the RF signals to be transmitted from antenna 110 to another wireless device or base station during a transmit (TX) mode of the transceiver circuit. In the exemplary embodiments shown in FIGS. 3, 5 and 8, the first amplifier 132 is a low noise amplifier (LNA) and the second amplifier 134 is a power amplifier (PA). It is noted, however, that the first and second amplifiers 132, 134 are not strictly limited to LNAs and PAs, and may be implemented with other types of amplifiers in other embodiments.

In the embodiment shown in FIG. 3, transceiver circuit 130 is a time division duplex (TDD) transceiver. In a TDD transceiver, the transmitter and receiver are not utilized simultaneously (i.e., TX and RX modes occur at different times). In order to conserve power in a TDD transceiver, LNA 132 is powered down or turned off during TX mode, and PA 134 is utilized to amply RF signals to be transmitted by the transceiver circuit. During RX mode, PA 134 is powered down or turned off and LNA 132 is utilized to amplify RF signals received by the transceiver circuit. In most embodiments, the resistance desired at the input of the LNA may be different from the resistance desired at the output of the PA. In such embodiments, the single, on-chip impedance matching network 136 shown in FIG. 3 may be reconfigured to provide a different impedance transformation during RX and TX modes of the TDD transceiver.

Although not illustrated in FIG. 3 for the sake of drawing clarity, one skilled in the art would understand that transceiver circuit 130 includes additional circuitry for transmitting and receiving RF signals. For example, transceiver circuit 130 may include a filter, analog-to-digital converter (ADC) and detector in the receive path to receive the RF signal amplified by amplifier 132, filter and decode the data contained therein. In some embodiments, transceiver circuit 130 may further include local oscillators, down-converting mixers, and an additional amplifier for separating and amplifying the RF signal output from amplifier 132 into intermediate frequency (IF) signals having in-phase (I) and quadrature-phase (Q) components. In some embodiments, a power detector and/or automatic gain control circuit may be included within transceiver circuit 30 to control the gain of the RF and/or IF amplifier(s). Transceiver circuit 130 may include similar components in the transmit path, such as filters, digital-to-analog-converters (DACs), up-converting mixers, phase locked-loops (PLLs), driver amplifier(s), including but not limited to amplifier 134, and gain control loop(s) for transmitting RF signals.

As shown in FIG. 3, impedance matching network 136 is coupled between antenna 110 and a shared node 138 to which the first and second amplifiers 132, 134 are directly connected. More specifically, impedance matching network 136 is directly connected to I/O pin 120 and directly connected to shared node 138, where "directly connected" means that no intervening circuit components are coupled between the recited components. Unlike wireless device 10, for example, wireless device 100 does not include a transmit/receive switch at shared node 138 to selectively connect the first amplifier 132 or the second amplifier 134 of transceiver circuit 130 to antenna 110. Avoiding the use of a transmit/receive switch improves the signal quality and decreases the cost and area consumption of wireless device 100 compared to the wireless device 10 shown in FIG. 1.

Figure 2:
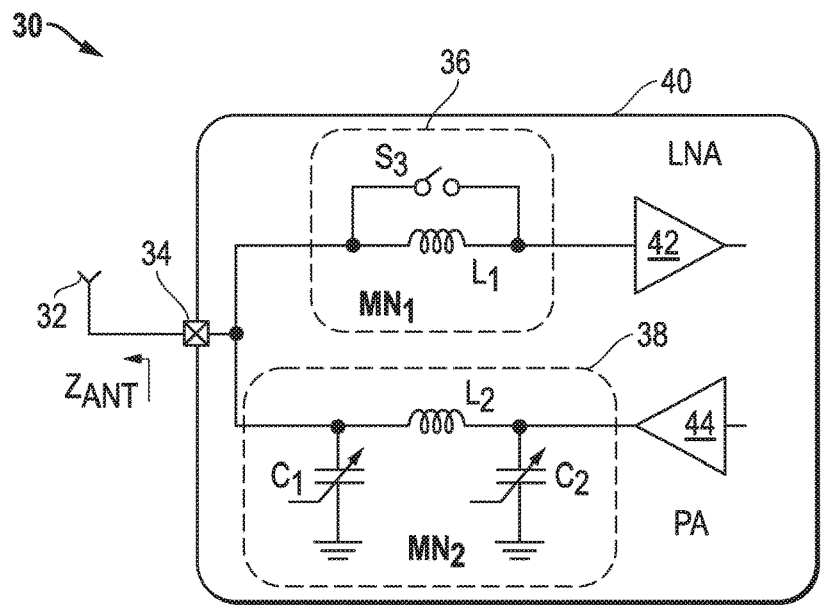
FIG. 2 (Prior Art) is a block diagram of a prior art wireless device including a transceiver circuit, which is provided on an IC chip having a pair of on-chip impedance matching networks.

As another advantage over the wireless devices shown in FIGS. 1 and 2, the transceiver circuit 130 shown in FIG. 3 includes a single, shared, on-chip impedance matching network 136 to provide the impedance transformations desired during receive (RX) and transmit (TX) modes of the transceiver circuit. In a general embodiment, impedance matching network 136 may include a plurality of reactive elements (e.g., inductors and capacitors), which are configured to transform the impedance ($Z_{ANT}$) of antenna 110 into a desired resistance ($R_X$) at the shared node 138. Impedance matching network 136 may generally include three or more reactive elements, as described in more detail below.

In order to provide the impedance transformations desired during RX and TX modes, the plurality of reactive elements may generally include at least one variable reactive element having a tunable reactance (or a tunable susceptance), which is reconfigurable to modify the resistance ($R_X$) provided at the shared node 138. By adjusting the reactance (or susceptance) of the at least one variable reactive element, the impedance matching network 136 shared by the first and second amplifiers 132 and 134 may be reconfigured to: (a) transform the impedance ($Z_{ANT}$) of antenna 110 into a desired resistance ($R_{LNA}$) at the input of the first amplifier 132 during RX mode, and (b) transform the impedance ($Z_{ANT}$) of antenna 110 into a desired resistance ($R_{PA}$) at the output of the second amplifier 134 during TX modes.

The desired resistance ($R_{LNA}$) at the input of the first amplifier 132, the desired resistance ($R_{PA}$) at the output of the second amplifier 134 and the configuration of the impedance matching network 136 are dependent on circuitry and operating characteristics of the first and second amplifiers. When the first amplifier 132 is implemented as an LNA, for example, impedance matching network 136 may be configured to provide an ideal passive voltage gain ($A_{v,ideal}$) in front of LNA 132 according to EQ. 1:

$$A_{v,ideal} = 2\sqrt{\frac{R_{LNA}}{\text{Re}(Z_{ANT})}} \qquad \text{EQ. 1}$$

where $\text{Re}(Z_{ANT})$ is the real part of the antenna impedance ($Z_{ANT}$), $R_{LNA}$ is the desired resistance at the input of LNA 132, and the factor of 2 is due to the reflection of the signal at the capacitive input of LNA 132. In RX mode, PA 134 is turned off and impedance matching network 136 is configured to provide a maximum resistance ($R_X=R_{LNA}=R_{max}$) at shared node 138 to, therefore, provide a maximum voltage gain ($A_{v,ideal}$) at the input of the LNA. The maximum voltage gain, and therefore, the desired resistance ($R_{LNA}$) at the input of LNA 132, is generally chosen to minimize the noise figure (NF) of the receiver and lower the current consumption of the LNA, while supporting the bandwidth of the receiver.

When the second amplifier 134 is implemented as a PA, impedance matching network 136 may be configured, in some embodiments, to support a maximum output power of the PA. For a class D PA, the maximum output power ($P_{max}$) may be calculated according to EQ. 2:

$$P_{max} \approx \frac{2}{\pi^2} \frac{V_{ddPA}^2}{R_{PA}} \qquad \text{EQ. 2}$$

where $V_{ddPA}$ is the PA supply voltage and $R_{PA}$ is the desired resistance at the output of PA 134. In TX mode, LNA 132 is turned off and impedance matching network 136 is configured, in one embodiment, to provide a minimum resistance ($R_X=R_{PA}=R_{op}$) at shared node 138 to support a maximum output power ($P_{max}$) at the output of the PA. The minimum resistance, $R_{op}$, designated as a minimum value for $R_X$ to minimize loss within impedance matching network 136. In some embodiments, impedance matching network 136 may be configured to set the resistance ($R_X$) at shared node 138 to a value between $R_{op}$ and $R_{max}$ during TX mode to provide PA 134 with a lower maximum output power and higher power efficiency for the same supply voltage.

Figure 9:
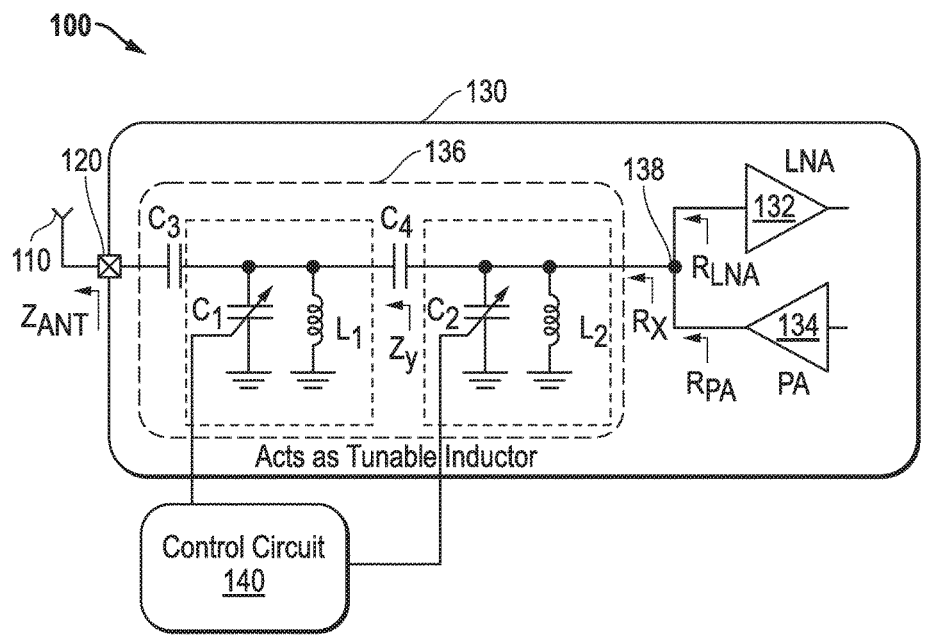
FIG. 9 is a block diagram of a wireless device including a transceiver circuit, which is provided on an IC chip having a shared, on-chip impedance matching network, in accordance with a fourth embodiment of the present disclosure.

As described in more detail below in reference to FIG. 4, the reactance of at least one variable reactive element within impedance matching network 136 may be adjusted to transform the antenna impedance ($Z_{ANT}$) into the maximum resistance ($R_X=R_{LNA}=R_{max}$) desired at the input of the LNA during RX mode, and the minimum resistance ($R_X=R_{PA}=R_{op}$) desired at the output of the PA during TX mode. In general, the at least one variable reactive element may be selected from a group consisting of variable capacitors and variable inductors (otherwise referred to as tunable capacitors and tunable inductors). In one embodiment, the at least one variable reactive element is implemented as a variable capacitor, and more specifically, as a digitally controlled capacitor array. Although the use of variable inductors is considered herein, they usually suffer from low quality factor, and are not generally preferred. FIG. 9 illustrates an alternative embodiment of an impedance matching network 136 in which a variable capacitor is coupled in parallel with a fixed inductor to mimic or act like a variable inductor.

In the embodiment shown in FIG. 3, impedance matching network 136 is implemented as a two-stage LC matching network comprising series inductors and shunt capacitors. In FIG. 3, a first stage of impedance matching network 136 includes a first series inductor ($L_3$) having a fixed inductance and a first variable capacitor ($C_1$), which is coupled to $L_3$ in an L-network configuration. A second stage of impedance matching network 136 includes a second series inductor ($L_4$) having a fixed inductance and a second variable capacitor ($C_2$), which is coupled to $L_4$ in an L-network configuration. The first stage may be generally configured to transform the impedance ($Z_{ANT}$) of antenna 110 into an intermediate impedance ($Z_Y$) at node 137. The second stage, which is cascaded with the first stage, may be generally configured to transform the intermediate impedance ($Z_Y$) into a desired resistance ($R_X$) at shared node 138. To achieve a different resistance ($R_X$) at the shared node 138 during RX and TX modes, the capacitance of at least one of the variable capacitors ($C_1$ and $C_2$) in the first and second stages may be adjusted to set $R_X=R_{max}=R_{LNA}$ during RX modes, and to set $R_X=R_{op}=R_{PA}$ during TX modes of the transceiver.

The impedance matching network 136 shown in FIG. 3 is implemented as an L-C-L-C network with series inductors and shunt capacitors, and therefore, acts as a low-pass filter. The low-pass filter implementation shown in FIG. 3 may be preferred in some embodiments to filter out high frequency harmonics of the output signal. In addition, digitally-controlled capacitor arrays have higher linearity, and are easier to implement, when they are connected shunt to ground, rather than connected in series. However, impedance matching network 136 is not strictly limited to an L-C-L-C network implementation. In some embodiments, impedance matching network 136 may be implemented as a C-L-C-L network of series capacitors and shunt inductors, which acts as a high-pass filter. An example of such an embodiment is shown in FIG. 9 and described in more detail below.

Control circuit 140 is coupled to adjust the capacitance of the variable capacitors ($C_1$ and $C_2$) included within the first and second stages to modify the resistance ($R_X$) at shared node 138 when switching between RX and TX modes. In one embodiment, control circuit 140 may include a memory element configured to store digital values corresponding to desired capacitance values for $C_1$ and $C_2$ at different functionality modes (e.g., RX mode, TX mode at maximum output power, TX mode at lower output power, etc.). According to one embodiment, variable capacitors $C_1$ and $C_2$ may be implemented as a binary weighted digitally-controlled capacitor array, and the desired capacitance values for $C_1$ and $C_2$ may each be stored within the memory element as a digital word. In another embodiment, control circuit 140 may additionally or alternatively include an adaptive loop, which is used to track changes in $Z_{ANT}$ and control $C_1$ and $C_2$, accordingly, to preserve the desired resistance at the output of PA 134. Although illustrated as an off-chip component in the block diagram of FIG. 3, it is noted that control circuit 140 is preferably provided on the transceiver circuit 130 IC chip.

In the present disclosure, two or more sets of capacitance values for variable capacitors $C_1$ and $C_2$ may be predetermined and used by control circuit 140 to provide the resistance ($R_X$) desired at shared node 138 for RX and TX modes. Depending on the particular manner in which control circuit 140 is implemented, the predetermined sets of capacitance values may be stored within, or otherwise supplied to, control circuit 140 for controlling or modifying the impedance transformation provided by the impedance matching network 136 during RX and TX modes.

For RX mode, a first set of capacitance values for variable capacitors $C_1$ and $C_2$ may be predetermined and used by control circuit 140 to set the resistance ($R_X$) at shared node 138 equal to a maximum resistance ($R_{max}=R_{LNA}$) at the input of LNA 132 that provides a maximum voltage gain ($A_{v,ideal}$) at the LNA input. As noted above, the maximum voltage gain may be chosen so as to minimize the noise figure (NF) of the receiver and lower the current consumption of the LNA, while supporting the bandwidth of the receiver.

For TX mode, a second set of capacitance values for variable capacitors $C_1$ and $C_2$ may be predetermined and used by control circuit 140 to set the resistance ($R_X$) at shared node 138 equal to a minimum resistance ($R_{op}=R_{PA}$) at the output of PA 134 that supports a maximum output power of the PA. In some embodiments, a third set of capacitance values for variable capacitors $C_1$ and $C_2$ may be predetermined and used by control circuit 140 to set the resistance ($R_X$) at shared node 138 equal to a higher resistance ($R_{max} \geq R_{PA} \geq R_{op}$) at the output of PA 134. In doing so, the third set of capacitance values may be used to support a lower maximum output power for the PA, thereby increasing the power efficiency of the PA.

According to one embodiment, the first set of capacitance values may be selected to transform the impedance ($Z_{ANT}$) of antenna 110 (e.g., 50Ω) into a desired resistance ($R_{LNA}$) of 350Ω at the input of LNA 132 to achieve a maximum voltage gain ($A_{v,ideal}$) of about 5.3 V/V. The second set of capacitance values may be selected to transform the impedance ($Z_{ANT}$) of antenna 110 (e.g., 50Ω) into a desired resistance ($R_{PA}$) of 160Ω at the output of PA 134 to achieve a maximum output power ($P_{max}$) of about 3 mW. In some embodiments, a third set of capacitance values may be selected to increase $R_{PA}$ to about 350Ω, thereby supporting a lower output power of about 1.4 mW for the PA. It is noted, however, that the first, second and third sets of capacitance values are not strictly limited to transforming the antenna impedance into the exemplary resistances mentioned above.

In general, control circuit 140 controls the impedance transformation provided by impedance matching network 136 by selectively applying the first set of capacitance values to variable capacitors $C_1$ and $C_2$ during RX mode, and the second set (or the third set) of capacitance values to variable capacitors $C_1$ and $C_2$ during TX mode. In doing so, control circuit 140 programmably configures impedance matching network 136 to transform the impedance ($Z_{ANT}$) of antenna 110 into the maximum resistance ($R_X=R_{max}=R_{LNA}$) desired at the input of LNA 132 during RX mode, and the minimum resistance ($R_X=R_{op}=R_{PA}$) desired at the output of PA 134 during TX mode.

Figure 4:
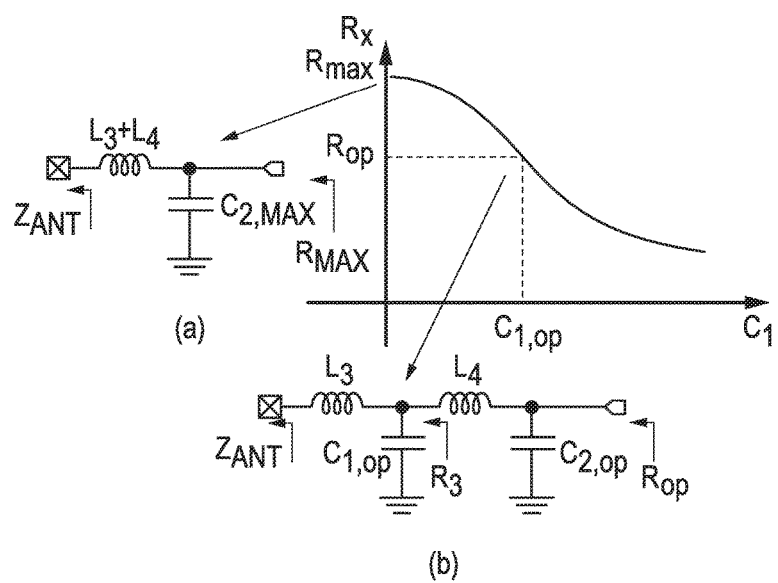
FIG. 4 is a graph illustrating a method for selecting predetermined values for the variable reactive elements included within the shared, on-chip impedance matching network of FIG. 3.

FIG. 4 is a graph illustrating a method for selecting the predetermined sets of capacitance values for the variable capacitors ($C_1$ and $C_2$) included within impedance matching network 136 during TX and RX modes. As noted above, PA 134 is turned off, LNA 132 is turned on, and the resistance ($R_X$) at shared node 138 is set equal to a maximum resistance ($R_{max}=R_{LNA}$) desired at the input of the LNA in RX mode. In TX mode, LNA 132 is turned off, PA 134 is turned on, and the resistance ($R_X$) at shared node 138 is set equal to a minimum resistance ($R_{op}=R_{PA}$) desired at the output of PA 134.

As shown in FIG. 4(a), the maximum resistance ($R_{max}$) desired at the input of the LNA may be determined by setting variable capacitor $C_1$ equal to a minimum value of capacitance (e.g., $C_{1,min}$) and setting variable capacitor $C_2$ to a value (e.g., $C_{2,max}$) that sets $R_x=R_{max}$. With $C_1$ set to a minimum value (e.g., close to zero) and $C_2$ set to $C_{2,max}$, impedance matching network 136 is effectively reduced to a single LC stage (see, FIG. 4(a)) represented by a series inductor (having a combined inductance of $L_3+L_4$) and a variable capacitor ($C_2=C_{2,max}$), which is coupled in shunt with the series inductor in an L-network configuration. In this configuration, impedance matching network 136 is configured to provide a maximum resistance ($R_{max}$) according to EQ. 3:

$$R_{max}=Re(Z_{ANT})(1+Q_{max}^2) \qquad \text{EQ. 3}$$

$$Q_{max}=\frac{\omega_0(L_3+L_4)+Im(Z_{ANT})}{Re(Z_{ANT})} \qquad \text{EQ. 4}$$

where, $Re(Z_{ANT})$ is the real part of the antenna impedance, $Im(Z_{ANT})$ is the imaginary part of the antenna impedance, $\omega_o$ is the angular frequency of the receiver and $Q_{max}$ is the quality factor of the impedance matching network depicted in FIG. 4(a).

In the configuration shown in FIG. 4(a), the maximum value ($C_{2,max}$) for variable capacitor $C_2$ may be determined according to EQ. 5:

$$C_{2,max}=\frac{Q_{max}}{\omega_0 R_{max}}=C_{t2}+C_{on,LNA}+C_{off,PA} \qquad \text{EQ. 5}$$

where, $R_{max}$, $Q_{max}$, and $\omega_o$ are defined as set forth above, $C_{t2}$ is the tuning capacitance of variable capacitor $C_2$, $C_{on,LNA}$ is the on capacitance of LNA 132 and $C_{off,PA}$ is the off capacitance of PA 134. In one example, $C_{1,min}$ may be 80 fF and $C_{2,max}$ may be 465 fF when $Z_{ANT}$=50Ω, $R_{LNA}$=350Ω, and $\omega_o$=2π×2.4 Grad/s. When $Z_{ANT}$=50Ω and $R_{LNA}$=350Ω, $C_{1,min}\approx 0.0012/\omega_o$ and $C_{2,max}\approx 0.007/\omega_o$ for alternative angular frequencies. Other values of $C_{1,min}$ and $C_{2,max}$ may be determined and used by control circuit 140 to transform $Z_{ANT}$ into alternative values of $R_{LNA}$. After $C_{1,min}$ and $C_{2,max}$ (i.e., the first set of capacitance values) are predetermined as set forth above, control circuit 140 may selectively apply these values to variable capacitors $C_1$ and $C_2$ during RX mode to transform the antenna impedance ($Z_{ANT}$) into the maximum resistance ($R_X=R_{max}=R_{LNA}$) desired at the input of LNA 132.

As shown in FIG. 4(b), the minimum resistance ($R_{op}$) desired at the output of PA 134 may be determined by considering impedance matching network 136 as a two-stage LC matching network, and determining the optimum values ($C_{1,op}$ and $C_{2,op}$) of variable capacitors $C_1$ and $C_2$ that can be used to transform $Z_{ANT}$ into $R_{op}$. As noted above, impedance matching network 136 may comprise a first stage (including, e.g., series inductor $L_3$ and shunt capacitor $C_1$) and a second stage (including, e.g., series inductor $L_4$ and shunt capacitor $C_2$), which is cascaded with the first stage. The first stage may be generally configured to transform the antenna impedance ($Z_{ANT}$) into an intermediate impedance ($Z_Y$) at node 137, and the second stage may be generally configured to transform the intermediate impedance ($Z_Y$) into the minimum resistance ($R_{op}$) desired at the output of the PA. When $R_X$ is set equal to $R_{op}$, as shown in FIG. 4(b), the first stage is ideally configured to transform $Z_{ANT}$ into a resistance ($R_3$) at node 137, and the second stage is ideally configured to transform $R_3$ into $R_{op}$.

To determine the optimum values ($C_{1,op}$ and $C_{2,op}$) of variable capacitors $C_1$ and $C_2$ needed to transform the $Z_{ANT}$ into $R_{op}$, the first and second stages of the impedance matching network 136 may be considered separately. For example, the first stage of impedance matching network 136 may be represented by EQs. 6 and 7:

$$R_3 = Re(Z_{ANT})(1+Q_3^2) \quad \text{EQ. 6}$$

$$Q_3 = \frac{\omega_0 L_3 + Im(Z_{ANT})}{Re(Z_{ANT})} \quad \text{EQ. 7}$$

where $R_3$ and $Q_3$ are the resistance and quality factor, respectively, of the first stage of the impedance matching network, $Re(Z_{ANT})$ is the real part of the antenna impedance, $Im(Z_{ANT})$ is the imaginary part of the antenna impedance, $\omega_o$ is the angular frequency of the transmitter and $L_3$ is the inductance of the series inductor in the first stage. To determine the optimum value ($C_{1,op}$) of variable capacitor $C_1$ needed to transform $Z_{ANT}$ into $R_3$, EQs. 6 and 7 are inserted into EQ. 8 to generate EQ. 9.

$$C_{1,op} = \frac{Q_3}{\omega_0 R_3} \quad \text{EQ. 8}$$

$$C_{1,op} = \frac{[\omega_0 L_3 + Im(Z_{ANT})]}{\omega_0[(\omega_0 L_3 + Im(Z_{ANT}))^2 + (Re(Z_{ANT}))^2]} \quad \text{EQ. 9}$$

As seen in EQ. 9, the optimum value ($C_{1,op}$) of variable capacitor $C_1$ can be determined from the antenna impedance ($Z_{ANT}$), the angular frequency of the transmitter ($\omega_o$) and the fixed inductance of the series inductor ($L_3$) in the first stage.

The second stage of the impedance matching network may be represented by EQs. 10 and 11:

$$R_{op} = R_3(1+Q_4^2) \quad \text{EQ. 10}$$

$$Q_4 = \frac{\omega_0 L_4}{R_3} \quad \text{EQ. 11}$$

where $R_{op}$ and $Q_4$ are the resistance and quality factor, respectively, of the second stage of the impedance matching network, and $L_4$ is the inductance of the series inductor in the second stage. To determine the optimum value ($C_{2,op}$) of variable capacitor $C_2$ needed to transform $R_3$ into $R_{op}$, EQs. 10 and 11 are inserted into EQ. 12 to generate EQ. 13.

$$C_{2,op} = \frac{Q_4}{\omega_0 R_{op}} = C_{t2,op} + C_{on,PA} + C_{off,LNA} \quad \text{EQ. 12}$$

$$C_{2,op} = \frac{L_4}{R_{op}\left[\frac{(\omega_0 L_3 + Im(Z_{ANT}))^2}{Re(Z_{ANT})} + Re(Z_{ANT})\right]} \quad \text{EQ. 13}$$

As seen in EQ. 13, the optimum value ($C_{2,op}$) of variable capacitor $C_2$ can be determined from the antenna impedance ($Z_{ANT}$), the angular frequency of the transmitter ($\omega_o$), the fixed inductance of the series inductor ($L_3$) in the first stage, and the fixed inductance of the series inductor ($L_4$) in the second stage. As shown in EQ. 12, $C_{2,op}$ can be additionally or alternatively defined as the sum of the tuning capacitance ($C_{t2}$) of variable capacitor $C_2$, the on capacitance ($C_{on,LNA}$) of LNA 132 and the off capacitance ($C_{off,PA}$) of PA 134.

To determine the combined inductance ($L_3+L_4$) for the series inductors ($L_3$ and $L_4$) included within the first and second stages, EQs. 3 and 4 are combined to generate EQ. 14, $R_{max}$ is set equal to $R_{LNA}$, and EQ. 14 is solved for the ($L_3+L_4$).

$$R_{max} = R_{LNA} = \left(Re(Z_{ANT}) + \frac{(\omega_0(L_3 + L_4) + Im(Z_{ANT}))^2}{Re(Z_{ANT})}\right) \quad \text{EQ. 14}$$

As noted above, $R_{LNA}$ may be determined from EQ. 1 and may be selected to provide a maximum voltage gain ($A_{v,ideal}$) at the input of LNA 132. According to one embodiment, EQ. 14 may result in combined inductance ($L_3+L_4$) of 8.1 nH for the series inductors ($L_3$ and $L_4$) when $R_{LNA}$=350Ω, $Z_{ANT}$=50Ω and $\omega_o$=2π×2.4 Grad/s.

To determine the individual inductance values for the series inductors ($L_3$ and $L_4$) included within the first and second stages, EQs. 6, 10 and 11 are combined to generate EQ. 15, and $R_{op}$ is set equal to $R_{PA}$.

$$R_{op} = R_{PA} = R_3\left(1 + \left[\frac{\omega_0 L_4}{R_3}\right]^2\right) = \quad \text{EQ. 15}$$

$$\frac{((Re(Z_{ANT})(1+Q_3^2))^2 + \omega_0^2 L_4^2)}{Re(Z_{ANT})(1+Q_3^2)}$$

$$= \left(Re(Z_{ANT}) + \frac{(\omega_0 L_3 + Im(Z_{ANT}))^2}{Re(Z_{ANT})}\right) +$$

$$\frac{\omega_0^2 L_4^2 Re(Z_{ANT})}{([Re(Z_{ANT})]^2 + (\omega_0 L_3 + Im(Z_{ANT}))^2)}$$

In some embodiments, $Z_{ANT}$=50Ω, $R_{PA}$=160Ω, and $\omega_o$=2π×2.4 Grad/s may be used in EQ. 15 to determine individual inductance values for $L_3$ and $L_4$. In one such embodiment, inductor $L_3$ may have a fixed inductance of 2.8 nH and inductor $L_4$ may have a fixed inductance of 5.3 nH. In another such embodiment, inductor $L_3$ may have a fixed inductance of 4.4 nH and inductor $L_4$ may have a fixed inductance of 3.7 nH.

Once the fixed inductance values for series inductors $L_3$ and $L_4$ are determined according to EQs. 14 and 15, they can be inserted into EQs. 9 and 13 to determine the optimum values ($C_{1,op}$ and $C_{2,op}$) of variable capacitors $C_1$ and $C_2$ that can be used to transform $Z_{ANT}$ into $R_{op}$. After $C_{1,op}$ and $C_{2,op}$ (i.e., the second set of capacitance values) are determined as set forth above, control circuit 140 may selectively apply these values to variable capacitors $C_1$ and $C_2$ during TX mode to transform the antenna impedance ($Z_{ANT}$) into the minimum resistance ($R_X$=$R_{op}$=$R_{PA}$) desired at the output of PA 134. In one embodiment, $C_{1,op}$ and $C_{2,op}$ may be 409 fF and 242 fF, respectively, when $Z_{ANT}$=50Ω, $R_{PA}$=160 Ω, $\omega_o$=2π×2.4 Grad/s, $L_3$=2.8 nH and $L_4$=5.3 nH. In another embodiment, $C_{1,op}$ and $C_{2,op}$ may be 465 fF and 122 fF, respectively, when $Z_{ANT}$=50Ω, $R_{PA}$=160 Ω, $\omega_o$=2π×2.4 Grad/s, $L_3$=4.4 nH and $L_4$=3.7 nH. Other values of $C_1$ and $C_2$ may be used to transform $Z_{ANT}$ into alternative values of $R_{PA}$. For example, $C_1$=80 fF and $C_2$=465 fF to transform $Z_{ANT}$=50Ω into $R_{PA}$=350Ω.

As set forth above, transceiver circuit 130 includes a single, shared, on-chip, impedance matching network 136, which is programmably configured to transform the antenna impedance ($Z_{ANT}$) into a maximum resistance ($R_X=R_{max}=R_{LNA}$) desired at the input of LNA 132 during RX mode, and a minimum resistance ($R_X=R_{op}=R_{PA}$) desired at the output of PA 134 during TX mode. Compared to the impedance matching networks ($MN_1$ and $MN_2$) shown in FIGS. 1 and 2, impedance matching network 136 consumes less area, and achieves better LNA and PA performance, while using only one I/O pad 120. As another advantage, impedance matching network 136 can be programmably configured with a higher resistance ($R_{PA}$) at the output of PA 134 to support lower dc power consumption and improved power efficiency at low output power. When PA 134 is turned off during RX mode, impedance matching network 136 may provide an additional advantage of providing electrostatic discharge (ESD) protection at the input of the LNA.

Figure 5:
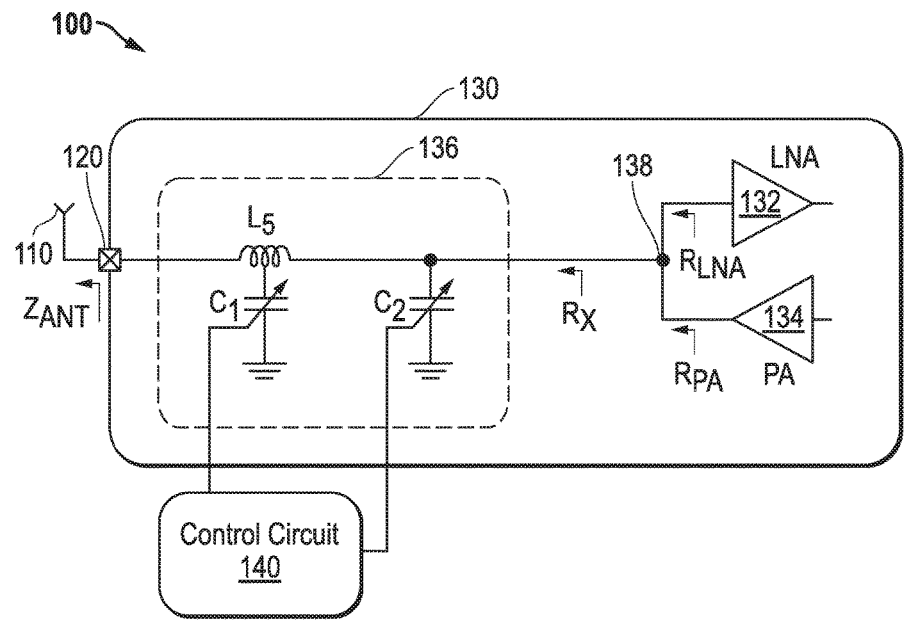
FIG. 5 is a block diagram of a wireless device including a transceiver circuit, which is provided on an IC chip having a shared, on-chip impedance matching network, in accordance with a second embodiment of the present disclosure.

FIG. 5 illustrates an exemplary wireless device 100 and transceiver circuit 130, in accordance with a second embodiment of the present disclosure. The wireless device 100 and transceiver circuit 130 shown in FIG. 5 may be substantially identical to those shown in FIG. 3 with the exception of impedance matching network 136. Like the previously disclosed embodiment, the impedance matching network 136 shown in FIG. 5 is directly connected between I/O pad 120 and shared node 138 for transforming the antenna impedance ($Z_{ANT}$) into a maximum resistance ($R_X=R_{max}=R_{LNA}$) desired at the input of LNA 132 during RX mode, and a minimum resistance ($R_X=R_{op}=R_{PA}$) desired at the output of PA 134 during TX mode. In addition, the impedance matching network 136 shown in FIG. 5 may be generally described as a two stage LC network having a first stage and a second stage, which is cascaded with the first stage.

Figure 6:
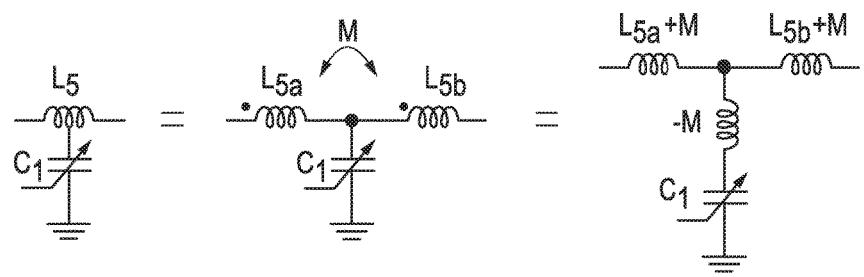
FIG. 6 is a schematic circuit diagram illustrating an effective inductance of the center-tapped inductor included within the shared, on-chip impedance matching network of FIG. 5.

In the impedance matching network 136 shown in FIG. 5, the series inductors $L_3$ and $L_4$ shown in FIG. 3 are replaced with a single inductor $L_5$ having a center tap point for connecting variable capacitor $C_1$ in shunt with inductor $L_5$. As shown in FIG. 6, coupling between the two sections ($L_{5a}$ and $L_{5b}$) of inductor $L_5$ increases the total series inductance of the impedance matching network by 2×M, where M is the mutual inductance between $L_{5a}$ and $L_{5b}$. In this embodiment, the two or more sets of predetermined values for variable capacitors $C_1$ and $C_2$ may generally be determined as set forth in EQs. 1-15 above by setting $L_3=L_{5a}+M$ and $L_4=L_{5b}+M$. However, the capacitance of variable capacitor $C_1$ should be increased to about $(\omega_o C_1)^2 M$ to overcome the negative inductance (−M) effectively placed in series with capacitor $C_1$, as shown in FIG. 6.

In addition to the advantages noted above, the impedance matching network 136 shown in the embodiment of FIG. 5 consumes even less area than the embodiment shown in FIG. 3. In addition, because the mutual inductance (M) between the two sections ($L_{5a}$ and $L_{5b}$) of the center tapped inductor ($L_5$) increases the total inductance of the impedance matching network 136, the size of inductor $L_5$ can be further reduced.

FIGS. 7A-B are schematic diagrams comparing the area consumed by the impedance matching networks 136 shown in the embodiments of FIGS. 3 and 5. In particular, FIG. 7A represents the area consumed by the impedance matching network 136 shown in the embodiment of FIG. 3. FIG. 7B represents the area consumed by the impedance matching network 136 shown in the embodiment of FIG. 5.

According to one embodiment, the series inductors $L_3$ and $L_4$ shown in FIG. 7A may be respectively implemented with 2.8 nH and 5.3 nH inductors to transform $Z_{ANT}$=50Ω into $R_{LNA}$=350Ω in RX mode and $R_{PA}$=160Ω in TX mode. The inner diameter of the inductors $L_3$ and $L_4$ may be set greater than 80 μm to ensure low loss. Inductor $L_3$ (2.8 nH) may be implemented with 2.5 turns, resulting in a 125 μm outer diameter. Inductor $L_4$ (5.3 nH) may be implemented with 4.5 turns, resulting in a 140 μm outer diameter. In such an example, inductor $L_3$ may consume 17,000 μm², inductor $L_4$ may consume 20,000 μm², resulting in a total area consumption of approximately 37,000 μm² for the inductors shown in FIG. 7A.

In comparison, the single inductor $L_5$ shown in FIG. 7B may be used to reduce the area consumed by series inductors $L_3$ and $L_4$. According to one embodiment, inductor $L_5$ may be an 8.1 nH inductor used to transform $Z_{ANT}$=50Ω into $R_{LNA}$=350Ω in RX mode and $R_{PA}$=160Ω in TX mode. In this example, inductor $L_5$ (8.1 nH) can be implemented with an inner diameter greater than 80 μm and 5.5 turns, resulting in a 155 μm outer diameter. In doing so, inductor $L_5$ may consume 24,000 μm², resulting in an area reduction of 13,000 μm² compared to the embodiment shown in FIG. 7A.

FIG. 8 illustrates a wireless device 100 and transceiver circuit 130, in accordance with a third embodiment of the present disclosure. The wireless device 100 and transceiver circuit 130 shown in FIG. 8 may be substantially identical to those shown in FIGS. 3 and 5 with the exception of impedance matching network 136. Like the previously disclosed embodiments, the impedance matching network 136 shown in FIG. 8 is directly connected between I/O pad 120 and shared node 138 for transforming the antenna impedance ($Z_{ANT}$) into a maximum resistance ($R_X=R_{max}=R_{LNA}$) desired at the input of LNA 132 during RX mode, and a minimum resistance ($R_X=R_{op}=R_{PA}$) desired at the output of PA 134 during TX mode. In addition, the impedance matching network 136 shown in FIG. 8 may be generally described as a multi-stage LC network.

In the impedance matching network 136 shown in FIG. 8, the series inductors $L_3$ and $L_4$ shown in FIG. 3 are replaced with a single inductor $L_5$ having multiple tap points for connecting a plurality of variable capacitors ($C_{1a}$, $C_{1b}$, $C_{1c}$, etc.) shunt to ground. In the multi-tap embodiment shown in FIG. 8, the capacitance of variable capacitors ($C_{1a}$, $C_{1b}$, $C_{1c}$, etc.) may be configured to increase the dynamic range of impedance matching network 136 by decreasing the minimum resistance ($R_X=R_{op}=R_{PA}$) desired at the output of PA 134 during TX mode. By using more than two step impedance transformation, a lower minimum resistance ($R_X=R_{op}$) can be achieved with the multiple L-networks shown in FIG. 8. However, the maximum resistance ($R_X=R_{max}$) may remain the same by setting $C_{1a}$, $C_{1b}$ and $C_{1c}$ to their minimum capacitance values.

It will be appreciated to those skilled in the art having the benefit of this disclosure that this disclosure is believed to provide embodiments of transceiver circuits having an improved impedance matching network. As described above, embodiments of the transceiver circuits described herein include a single, shared, on-chip, impedance matching network 136, which is programmably configured to transform an antenna impedance ($Z_{ANT}$) into a maximum resistance ($R_{max}$) desired at the input of an LNA during RX mode, and a minimum resistance ($R_{op}$) desired at the output of a PA during TX mode. In some embodiments, the impedance matching network 136 described herein may be configured to transform the antenna impedance ($Z_{ANT}$) into a resistance $R_X$, where $R_{op} \leq R_X \leq R_{max}$. All embodiments of the impedance matching network 136 described herein consume less area and achieve better LNA and PA performance than conventional on-chip and off-chip impedance matching networks (e.g., $MN_1$ and $MN_2$ shown in FIGS. 1 and 2).

Additional embodiments of the impedance matching network 136 are provided herein to further reduce area consumption and/or increase the dynamic range of the impedance matching network.

It is to be understood that the various embodiments of the transceiver circuits and impedance matching networks shown and described herein are to be taken as presently preferred embodiments. In the embodiments shown in FIGS. 3, 5 and 8, impedance matching network 136 is implemented as an L-C-L-C network of series inductors and variable capacitors, where each variable capacitor is coupled to one of the series inductors in an L-network configuration. It is noted, however, that the impedance matching network contemplated herein is not limited to such a network configuration.

FIG. 9 illustrates a wireless device 100 and transceiver circuit 130, in accordance with a fourth embodiment of the present disclosure. The wireless device 100 and transceiver circuit 130 shown in FIG. 9 may be substantially identical to those shown in FIGS. 3, 5 and 8 with the exception of impedance matching network 136. Like the previously disclosed embodiments, the impedance matching network 136 shown in FIG. 9 is directly connected between I/O pad 120 and shared node 138 for transforming the antenna impedance ($Z_{ANT}$) into a maximum resistance ($R_X=R_{max}=R_{LNA}$) desired at the input of LNA 132 during RX mode, and a minimum resistance ($R_X=R_{op}=R_{PA}$) desired at the output of PA 134 during TX mode. In addition, the impedance matching network 136 shown in FIG. 9 may be generally described as a two stage LC network having a first stage and a second stage, which is cascaded with the first stage.

Instead of the L-C-L-C network implementation shown in FIGS. 3, 5, and 8, the impedance matching network 136 shown in FIG. 9 is implemented as a C-L-C-L network of series capacitors and shunt inductors. In FIG. 9, the first stage includes a first series capacitor ($C_3$) and a first shunt inductor ($L_1$), which is coupled to the series capacitor ($C_3$) in an L-network. The second stage includes a second series capacitor ($C_4$) and a second shunt inductor ($L_2$), which is coupled to the series capacitor ($C_4$) in an L-network. As in the previously disclosed embodiments, the first and second stages further include a variable reactive element, which is programmably configured to modify the resistance ($R_X$) at the shared node 138 to achieve the resistances desired at the shared node 138 during RX and TX modes. Since tunable inductors exhibit low quality factor, variable capacitors ($C_1$ and $C_2$) are included within the first and second stages of the impedance matching network 136 shown in FIG. 9 to provide the desired tunabililty. As shown in FIG. 9, the variable capacitors $C_1$ and $C_2$ included within the first and second stages are coupled in parallel with the shunt inductors $L_1$ and $L_2$.

In the embodiment shown in FIG. 9, the capacitance of variable shunt capacitors $C_1$ and $C_2$ is programmably configured to change the effective susceptance ($B_1$ and $B_2$) of $L_1C_1$ and $L_2C_2$ during RX and TX modes. This enables $L_1C_1$ and $L_2C_2$ to act like tunable inductors without exhibiting low quality factor. When $R_X=R_{max}$, $C_1$ may be tuned to cancel the admittance of $L_1$ at $\omega_o$, and $C_2$ may be used to tune $L_2$ to an effective inductance value $L_{2,max}$. When $R_X=R_{op}$, $C_1$ is set to minimum value, such that the first stage L-network can be simplified as series $C_3$ and shunt $L_1$ transforming $Z_{ANT}$ to $Z_Y=R_3$. The second stage L-network is a series capacitor $C_4$ and an effective inductance value ($L_{2,op}$) of the parallel combination of $C_2$ and $L_2$ at $\omega_o$. The second stage L-network transforms $Z_Y$ to $R_X=R_{op}$ at the shared node 138.

Figure 10:
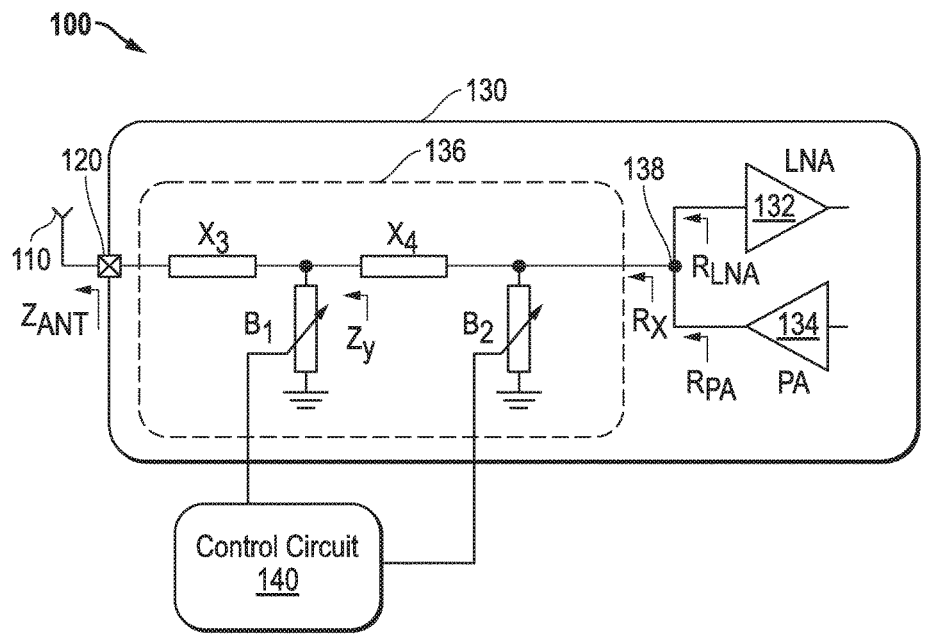
FIG. 10 is a block diagram of a wireless device including a transceiver circuit, which is provided on an IC chip having a shared, on-chip impedance matching network, in accordance with a fifth embodiment of the present disclosure.

FIG. 10 illustrates a wireless device 100 and transceiver circuit 130, in accordance with a fifth embodiment of the present disclosure. The wireless device 100 and transceiver circuit 130 shown in FIG. 10 may be substantially identical to those shown in FIGS. 3, 5, 8 and 9 with the exception of impedance matching network 136. Like the previously disclosed embodiments, the impedance matching network 136 shown in FIG. 10 is directly connected between I/O pad 120 and shared node 138 for transforming the antenna impedance ($Z_{ANT}$) into a maximum resistance ($R_X=R_{max}=R_{LNA}$) desired at the input of LNA 132 during RX mode, and a minimum resistance ($R_X=R_{op}=R_{PA}$) desired at the output of PA 134 during TX mode. In addition, the impedance matching network 136 shown in FIG. 10 may be generally described as a two stage LC network having a first stage and a second stage, which is cascaded with the first stage.

The impedance matching network 136 shown in FIG. 10 is illustrated generically in block diagram form as a two stage LC network of series reactances ($X_3$ and $X_4$) and shunt susceptances ($B_1$ and $B_2$). One skilled in the art would understand that there are numerous ways in which the impedance matching network 136 shown in FIG. 10 can be implemented using different combinations of reactive elements, where at least one reactive element in each stage is a variable reactive element.

In order to provide a maximum resistance ($R_X=R_{max}$) at shared node 138 during RX mode, susceptance $B_1$ is set to a minimum absolute value (e.g., nearly zero) and susceptance $B_2$ is set to value (e.g., $B_{2max}$) that sets $R_X=R_{max}$. With $B_1$ set to a minimum absolute value (e.g., close to zero) and $B_2$ set to $B_{2,max}$, impedance matching network 136 is effectively reduced to a single LC stage having a series reactance ($X_3+X_4$) and shunt susceptance $B_2$. In this configuration, impedance matching network 136 may provide a maximum resistance ($R_{max}$) according to EQS. 3 and 4 above when $\omega_o(L_3+L_4)$ is replaced with ($X_3+X_4$). The susceptance $B_2$ ($B_{2,max}=\omega_oC_{2,max}$) required to set $R_X=R_{max}$ may be determined in accordance with EQ. 5.

In order to provide a minimum resistance ($R_X=R_{op}$) at shared node 138 during TX mode, the first stage ($X_3$-$B_{1,op}$) and second stage ($X_4$-$B_{2,op}$) of impedance matching network 136 are considered separately to determine the optimum values ($B_{1,op}$ and $B_{2,op}$) of susceptances $B_1$ and $B_2$ needed to transform $Z_{ANT}$ into $R_{op}$. When $R_X$ is set equal to $R_{op}$, the first stage may be configured to transform $Z_{ANT}$ into a resistance ($R_3$) at node 137, according to EQS. 6 and 7, when $\omega_oL_3$ is replaced with $X_3$. The optimum value ($B_{1,op}=\omega_oC_{1,op}$) of susceptance $B_1$ may be determined in accordance with EQS. 8-9. The second stage of the impedance matching network 136 may be configured to transform $R_3$ into $R_{op}$ at node 138, according to EQS. 10-11, when ($\omega_oL_3$ and $\omega_oL_4$) are replaced with ($X_3$ and $X_4$). The optimum value ($B_{2,op}=\omega_oC_{2,op}$) of susceptance $B_2$ may be determined in accordance with EQS. 12-13.

Further modifications and alternative embodiments of various aspects of the disclosure will be apparent to those skilled in the art in view of this description. Elements and materials may be substituted for those illustrated and described herein, parts and processes may be reversed, and certain features of the disclosed embodiments may be utilized independently, all as would be apparent to one skilled in the art after having the benefit of this disclosure. It is intended, therefore, that the following claims be interpreted to embrace all such modifications and changes and, accordingly, the specification and drawings are to be regarded in an illustrative rather than a restrictive sense.

What is claimed is:

1. A transceiver circuit, comprising:
   a first amplifier coupled to receive signals from an antenna during a receive (RX) mode of the transceiver circuit;
   a second amplifier coupled to transmit signals to the antenna during a transmit (TX) mode of the transceiver circuit, wherein the first and second amplifiers are directly connected to a shared node;
   a single impedance matching network coupled to the antenna, directly connected to the shared node, and configured to transform an impedance of the antenna into a resistance at the shared node, wherein the single impedance matching network comprises a multiple stage inductor-capacitor (LC) network including at least a first stage and a second stage cascaded with the first stage, wherein the first stage and the second stage each comprise at least one variable capacitor having a capacitance that is reconfigurable; and
   a control circuit coupled to the single impedance matching network, and configured to control the capacitance of the variable capacitors included within the first and second stages to provide a first resistance at the shared node during RX mode and a second resistance at the shared node during TX mode:
      wherein the first resistance is a resistance at an input of the first amplifier that achieves a maximum voltage gain at the input of the first amplifier;
      wherein the second resistance is a resistance at an output of the second amplifier that achieves a maximum output power at the output of the second amplifier; and
      wherein the second resistance is different from the first resistance.

2. The transceiver circuit as recited in claim 1, wherein the transceiver circuit is time division duplex (TDD) transceiver, and wherein the TX and RX modes occur at different times.

3. The transceiver circuit as recited in claim 1, wherein the first amplifier, the second amplifier and the single impedance matching network are provided on an integrated circuit (IC) chip, wherein the antenna is not provided on the IC chip, and wherein the single impedance matching network is coupled to the antenna via a single input/output (I/O) pad of the IC chip.

4. The transceiver circuit as recited in claim 3, wherein the single impedance matching network is directly connected to the single I/O pad of the IC chip and directly connected to the shared node.

5. The transceiver circuit as recited in claim 1, wherein the single impedance matching network comprises a plurality of reactive elements, and wherein the plurality of reactive elements comprise at least one variable reactive element having a reactance that is reconfigurable to provide the first resistance at the shared node during RX mode and the second resistance at the shared node during TX mode.

6. The transceiver circuit as recited in claim 1, wherein the first stage and the second stage each comprise a series inductor and a variable capacitor coupled to the series inductor in an L-network configuration.

7. The transceiver circuit as recited in claim 1, wherein the first stage comprises a series inductor and a first variable capacitor, which is coupled to a center tap point of the series inductor, and wherein the second stage comprises a second variable capacitor coupled to the series inductor in an L-network configuration.

8. The transceiver circuit as recited in claim 1, wherein the first stage comprises a series inductor and a plurality of variable capacitors, each coupled to a different tap point of the series inductor, and wherein the second stage comprises an additional variable capacitor coupled to the series inductor in an L-network configuration.

9. The transceiver circuit as recited in claim 1, wherein the first stage and the second stage each comprise a series capacitor and a shunt inductor, and wherein the first stage and the second stage each further comprise a variable capacitor, which is coupled in parallel with the shunt inductor.

10. The transceiver circuit as recited in claim 1, wherein the control circuit uses two or more sets of predetermined values to control the capacitance of the variable capacitors included within the first and second stages.

11. The transceiver circuit as recited in claim 10, wherein the control circuit comprises a memory element for storing the two or more sets of predetermined values.

12. The transceiver circuit as recited in claim 10, wherein the two or more sets of predetermined values comprise:
   a first set of predetermined values used during RX mode to control the capacitance of the variable capacitors included within the first and second stages to transform the impedance of the antenna into the first resistance; and
   a second set of predetermined values used during TX mode to control the capacitance of the variable capacitors included within the first and second stages to transform the impedance of the antenna into the second resistance; and
   wherein the second set of predetermined values differ from the first set of predetermined values.

13. The transceiver circuit as recited in claim 12, wherein the two or more sets of predetermined values further comprise a third set of predetermined values used during TX mode to control the capacitance of the variable capacitors included within the first and second stages to transform the impedance of the antenna into a third resistance, which is greater than the second resistance.

14. A method for configuring a single impedance matching network shared by a first amplifier in a receive path and a second amplifier in a transmit path of a transceiver circuit, wherein the single impedance matching network comprises a two-stage inductor-capacitor (LC) network, wherein a first stage of the LC network and a second stage of the LC network each comprise at least one variable capacitor, and wherein the method comprises:
   determining a first set of capacitance values for configuring the variable capacitors included within the first and second stages of the LC network, wherein the first set of capacitance values is subsequently used during a receive mode of the transceiver circuit to transform an antenna impedance into a first resistance at an input of the first amplifier that achieves a maximum voltage gain at an input of the first amplifier;
   determining a second set of capacitance values for configuring the variable capacitors included within the first and second stages of the LC network, wherein the second set of capacitance values is subsequently used during a transmit mode of the transceiver circuit to transform the antenna impedance into a second resistance at an output of the second amplifier that achieves a maximum output power at an output of the second amplifier;
   wherein the second resistance is different from the first resistance; and wherein the second set of capacitance values differ from the first set of capacitance values.

15. The method as recited in claim 14, wherein said determining a first set of capacitance values comprises setting a first variable capacitor in the first stage to a minimum capacitance value and determining a maximum capacitance value of a second variable capacitor in the second stage, wherein the maximum capacitance value is proportional to a quality factor of the LC network and inversely proportional to a maximum resistance of the LC network.

16. The method as recited in claim 14, wherein said determining a second set of capacitance values comprises determining a first capacitance value of a first variable capacitor in the first stage of the LC network for transforming the impedance of the antenna into an intermediate resistance, wherein the first capacitance value is proportional to a quality factor of the first stage of the LC network and inversely proportional to the intermediate resistance.

17. The method as recited in claim 16, wherein said determining a second set of capacitance values further comprises determining a second capacitance value of a second variable capacitor in the second stage of the LC network for transforming the intermediate resistance into the second resistance, wherein the second capacitance value is proportional to a quality factor of the second stage of the LC network and inversely proportional to the second resistance.

18. A transceiver circuit, comprising:
a first amplifier coupled to receive signals from an antenna during a receive (RX) mode of the transceiver circuit;
a second amplifier coupled to transmit signals to the antenna during a transmit (TX) mode of the transceiver circuit, wherein the first and second amplifiers are directly connected to a shared node;
a single impedance matching network coupled to the antenna, directly connected to the shared node, and configured to transform an impedance of the antenna into a resistance at the shared node, wherein the single impedance matching network comprises a multiple stage inductor-capacitor (LC) network including at least a first stage and a second stage cascaded with the first stage:
wherein the first stage comprises a series inductor and at least one variable capacitor, which is coupled to a center tap point of the series inductor; and
wherein the second stage comprises an additional variable capacitor coupled to the series inductor in an L-network configuration; and
a control circuit coupled to control the impedance transformation of the single impedance matching network, so as to provide a first resistance at the shared node during RX mode and a second resistance at the shared node during TX mode, wherein the second resistance is different from the first resistance.

19. The transceiver circuit as recited in claim 18, wherein the at least one variable capacitor included within the first stage comprises a plurality of variable capacitors, each coupled to a different tap point of the series inductor.

20. The transceiver circuit as recited in claim 18, wherein the control circuit is coupled to the single impedance matching network and configured to control the capacitance of the variable capacitors included within the first and second stages to provide the first resistance at the shared node during RX mode and the second resistance at the shared node during TX mode.

21. The transceiver circuit as recited in claim 20, wherein the control circuit uses two or more sets of predetermined values to control the capacitance of the variable capacitors included within the first and second stages, and wherein the two or more sets of predetermined values comprise:
a first set of predetermined values used during RX mode to control the capacitance of the variable capacitors included within the first and second stages to transform the impedance of the antenna into the first resistance, wherein the first resistance is a resistance at an input of the first amplifier that achieves a maximum voltage gain at the input of the first amplifier; and
a second set of predetermined values used during TX mode to control the capacitance of the variable capacitors included within the first and second stages to transform the impedance of the antenna into the second resistance, wherein the second resistance is a resistance at an output of the second amplifier that achieves a maximum output power at the output of the second amplifier; and
wherein the second set of predetermined values differ from the first set of predetermined values.

22. The transceiver circuit as recited in claim 21, wherein the two or more sets of predetermined values further comprise a third set of predetermined values used during TX mode to control the capacitance of the variable capacitors included within the first and second stages to transform the impedance of the antenna into a third resistance, which is greater than the second resistance.

* * * * *